United States Patent
Zhao et al.

(10) Patent No.: US 12,375,306 B2
(45) Date of Patent: Jul. 29, 2025

(54) MUTUAL AUTHENTICATION METHOD AND APPARATUS

(71) Applicant: HUAWEI TECHNOLOGIES CO., LTD., Guangdong (CN)

(72) Inventors: Mingyu Zhao, Shanghai (CN); Xueqiang Yan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 207 days.

(21) Appl. No.: 18/181,871

(22) Filed: Mar. 10, 2023

(65) Prior Publication Data
US 2023/0208656 A1 Jun. 29, 2023

Related U.S. Application Data

(63) Continuation of application No. PCT/CN2021/112904, filed on Aug. 17, 2021.

(30) Foreign Application Priority Data

Sep. 14, 2020 (CN) .......................... 202010960237.X

(51) Int. Cl.
*H04L 9/32* (2006.01)
*H04L 9/08* (2006.01)
*H04L 9/30* (2006.01)

(52) U.S. Cl.
CPC .......... *H04L 9/3273* (2013.01); *H04L 9/0869* (2013.01); *H04L 9/30* (2013.01)

(58) Field of Classification Search
CPC ....... H04L 9/3273; H04L 9/0869; H04L 9/30; H04L 63/0869; H04W 12/03; H04W 12/08
See application file for complete search history.

(56) References Cited

U.S. PATENT DOCUMENTS

| 8,515,066 B2 * | 8/2013 | Saito | .................... H04L 61/4535 713/168 |
| 10,219,157 B1 * | 2/2019 | Jiang | ..................... H04L 63/062 |

(Continued)

FOREIGN PATENT DOCUMENTS

| CN | 101523800 A | 9/2009 | |
| WO | WO-2017188895 A1 * | 11/2017 | ......... H04L 63/0823 |

OTHER PUBLICATIONS

CableLabs, "A Comparative Introduction to 4G and 5G Authentication," Feb. 6, 2019, 19 pages.

(Continued)

*Primary Examiner* — Lizbeth Torres-Diaz
(74) *Attorney, Agent, or Firm* — Fish & Richardson P.C.

(57) ABSTRACT

The present disclosure relates to mutual authentication methods and apparatuses. In one example method, a digital reflection (DR) sends a first message to a terminal device, where the first message includes a first DR public key that is a public key of the DR signed by using a private key of a home network. The DR encrypts a first random number by using a second terminal device public key. The DR sends a second message to the terminal device, where the second message includes the first random number encrypted by using the second terminal device public key. The DR receives a second response message sent by the terminal device, where the second response message includes an encrypted first random number encrypted by using a second DR public key. The DR decrypts the encrypted first random number by using a private key of the DR to obtain the first random number.

20 Claims, 6 Drawing Sheets

(56) References Cited

U.S. PATENT DOCUMENTS

| | | | |
|---|---|---|---|
| 10,657,293 B1* | 5/2020 | Wei | H04L 9/0866 |
| 11,026,084 B2* | 6/2021 | Kang | H04W 12/35 |
| 11,240,218 B2* | 2/2022 | Wu | H04L 63/0892 |
| 2002/0026577 A1* | 2/2002 | Futamura | H04L 9/3273 |
| | | | 713/156 |
| 2002/0027992 A1* | 3/2002 | Matsuyama | H04L 9/3247 |
| | | | 348/E7.071 |
| 2006/0133613 A1* | 6/2006 | Ando | H04L 63/205 |
| | | | 380/270 |
| 2008/0155260 A1* | 6/2008 | Perez | H04W 12/041 |
| | | | 713/169 |
| 2013/0145481 A1* | 6/2013 | Kozuka | G11B 20/0021 |
| | | | 726/27 |
| 2018/0285555 A1* | 10/2018 | Dong | H04L 63/0428 |
| 2019/0058701 A1* | 2/2019 | Wu | H04L 9/3242 |
| 2019/0208417 A1* | 7/2019 | Kang | H04W 12/03 |
| 2020/0169875 A1* | 5/2020 | Sundar | H04L 9/14 |
| 2020/0344071 A1* | 10/2020 | Wright | H04L 9/0841 |
| 2021/0091932 A1* | 3/2021 | Liu | H04L 63/0442 |
| 2022/0337403 A1* | 10/2022 | Nagai | H04L 9/0894 |
| 2023/0108770 A1* | 4/2023 | Fach | B60R 25/24 |
| | | | 713/169 |

OTHER PUBLICATIONS

3GPP TS 33.501 V16.1.0, "3rd Generation Partnership Project; Technical Specification Group Services and System Aspects; Security architecture and procedures for 5G system (Release 16)," Dec. 2019, 202 pages.

Basin et al., "A Formal Analysis of 5G Authentication," Corr, submitted on Oct. 18, 2018, arXiv:1806.10360v3, 21 pages.

Jover et al., "dHSS—Distributed P2P implementation of the LTE HSS based on the Bitcoin-Namecoin architecture," Proceeding of 2016 IEEE International Conference on Communications Workshops (ICC), Mar. 17, 2016, 6 pages.

International Search Report and Written Opinion in International Appln. No. PCT/CN2021/112904, mailed on Nov. 18, 2021, 17 pages (with English translation).

* cited by examiner

MUTUAL AUTHENTICATION METHOD AND APPARATUS

CROSS-REFERENCE TO RELATED APPLICATIONS

This application is a continuation of International Application No. PCT/CN2021/112904, filed on Aug. 17, 2021, which claims priority to Chinese Patent Application No. 202010960237.X, filed on Sep. 14, 2020. The disclosures of the aforementioned applications are hereby incorporated by reference in their entireties.

TECHNICAL FIELD

This application relates to the communication field, and more specifically, to a mutual authentication method and an apparatus.

BACKGROUND

Existing communication networks are all network-centric, and users adapt to the networks. In other words, the users can select only functions provided by the networks. What's worse, functions provided by a centralized core network are of a large granularity. Consequently, personalized requirements of the users cannot be satisfied. An existing network element entity of the centralized core network can generally handle a large quantity of users. In addition, the network element entity of the centralized core network is centrally deployed, and has a relatively high position in the network. This poses a risk of a single point of failure. For example, the network element entity of the centralized core network may be a mobility management network element, a session management network element, a user data management network element, or a policy management network element.

Currently, a user-centric network (UCN) architecture is proposed. A digital reflection (DR) is deployed on an edge cloud. Each UE has its own DR. The DR may be dynamically migrated with a user as required to multi-access edge computing (MEC) in which the user is located, to implement a design of the user-centric network architecture.

The UCN architecture is a revolutionary design compared to an existing network architecture. Therefore, many existing network functions, communication solutions, working procedures, and the like need to be changed accordingly. Two-way authentication between a user and a network is a relatively important key procedure in an initial phase of establishing a communication connection. In this case, an urgent technical problem to be resolved is two-way authentication between a UE and a DR when the user turns on the UE for a first time and performs registration, or when the user turns off the UE for a long time and then turns on the UE.

SUMMARY

This application provides a mutual authentication method and an apparatus, to avoid user information leakage.

According to a first aspect, a mutual authentication method is provided. The method includes: A digital reflection DR sends a first message to a terminal device, where the first message includes a first DR public key, and the first DR public key is a public key that is of the DR and that is signed by using a private key of a home network. The DR encrypts a first random number by using a second terminal device public key, where the first random number is generated by the DR, and the second terminal device public key is a public key that is of the terminal device and that is verified by using a public key of the home network. The DR sends a second message to the terminal device, where the second message includes a first random number encrypted by using the second terminal device public key. The DR receives a second response message sent by the terminal device, where the second response message includes a first random number encrypted by using a second DR public key, and the second DR public key is a public key that is of the DR and that is obtained by verifying the first DR public key by using the public key of the home network. The DR decrypts the encrypted first random number by using a private key of the DR, to obtain the first random number.

Based on the foregoing technical solution, the DR encrypts the first random number by using a public key of the terminal device, and sends an encrypted first random number to the terminal device. If the terminal device decrypts the first random number by using a private key of the terminal device, the terminal device is authenticated by the DR, and the terminal device is a terminal device associated with the DR. This solution can implement authentication between a terminal device and a network in a UCN architecture, thereby avoiding user information leakage.

In an implementation, the second response message further includes a second random number encrypted by using the second DR public key. The second random number is generated by the terminal device.

In an implementation, the method further includes: The DR decrypts, by using the private key of the DR, the second random number encrypted by using the second DR public key, to obtain the second random number. The DR encrypts the second random number by using the second terminal device public key. The DR sends a third message to the terminal device, where the third message includes a second random number encrypted by using the second terminal device public key. If the DR decrypts the second random number by using the private key of the DR, the DR sends, to the terminal device, the second random number encrypted by using the public key of the terminal device. After the terminal device receives the second random number encrypted by using the public key of the terminal device, the terminal device confirms that the DR receives the second response message sent by the terminal device, and authentication performed by the DR on the terminal device is completed.

In an implementation, before the digital reflection DR sends the first message to the terminal device, the method further includes: The DR sends a fourth message to a distributed database DDB, where the fourth message is used to request a public key of the terminal device and a public key of the DR, and the fourth message includes an identifier of the terminal device and an identifier of the DR. The DR receives a fourth response message sent by the DDB, where the fourth response message includes a first terminal device public key and the first DR public key, and the first terminal device public key is a public key that is of the terminal device and that is signed by using the private key of the home network.

In an implementation, that the DR receives a fourth response message sent by the DDB includes: The DR verifies the first terminal device public key by using the public key of the home network, to obtain the second terminal device public key.

In an implementation, before the DR sends the fourth message to the distributed database DDB, the method further includes: The DR receives a fifth message sent by a subscription identifier de-concealing function SIDF, where the fifth message includes the identifier of the terminal device.

In an implementation, before the DR sends the fourth message to the distributed database DDB, the method further includes: The DR receives a sixth message sent by a network device, where the sixth message includes the first terminal device identifier, and the first terminal device identifier is an identifier that is of the terminal device and that is encrypted by using the public key of the home network.

In an implementation, that the DR receives a sixth message sent by a network device includes: The DR decrypts the first terminal device identifier by using the private key of the home network, to obtain the identifier of the terminal device.

In an implementation, the sixth message further includes an identifier that is of the home network and that is signed by using a private key of the network device; and the method further includes: The DR decrypts, by using a public key of the network device, the identifier that is of the home network and that is signed by using the private key of the network device, to verify that the network device is valid.

In an implementation, before the DR decrypts, by using a public key of the network device, the identifier that is of the home network and that is signed by using the private key of the network device, the method further includes: The DR sends a seventh message to the DDB, where the seventh message is used to request the public key of the network device, and the seventh message includes an identifier of the network device. The DR receives a seventh response message sent by the DDB, where the seventh response message includes a public key that is of the network device and that is signed by using the private key of the home network. The DR verifies, by using the public key of the home network, the public key that is of the network device and that is signed by using the private key of the home network, to obtain the public key of the network device.

According to a second aspect, a mutual authentication method is provided. The method includes: A terminal device receives a first message sent by a digital reflection DR, where the first message includes a first DR public key, and the first DR public key is a public key that is of the DR and that is signed by using a private key of a home network. The terminal device receives a second message sent by the DR, where the second message includes a first random number encrypted by using a second terminal device public key, the first random number is generated by the DR, and the second terminal device public key is a public key that is of the terminal device and that is verified by using a public key of the home network. The terminal device decrypts, by using a private key of the terminal device, the first random number encrypted by using the second terminal device public key, to obtain the first random number. The terminal device encrypts the first random number based on the first DR public key, to obtain an encrypted first random number. The terminal device sends a second response message to the DR, where the second response message includes the encrypted first random number.

Based on the foregoing technical solution, the terminal device decrypts, by using the private key of the terminal device, the first random number encrypted by using the public key of the terminal device. If the terminal device obtains the first random number through decryption, the terminal device encrypts the first random number by using the public key of the DR, and sends the second response message to the DR. The second response message includes the first random number encrypted by using the public key of the DR. The DR obtains the first random number through decryption. Therefore, the DR considers that the terminal device is a terminal device associated with the DR. This solution can implement authentication between a terminal device and a network in a UCN architecture, thereby avoiding user information leakage.

In an implementation, that the terminal device encrypts the first random number based on the first DR public key includes: The terminal device verifies the first DR public key by using the public key of the home network, to obtain a second DR public key, where the second DR public key is a public key that is of the DR and that is verified by using the public key of the home network. The terminal device encrypts the first random number by using the second DR public key.

In an implementation, before the terminal device receives the first message sent by the digital reflection DR, the method further includes: The terminal device sends an eighth message to a network device, where the eighth message includes a first terminal device identifier, and the first terminal device identifier is an identifier that is of the terminal device and that is encrypted by using the public key of the home network.

In an implementation, the eighth message further includes an identifier of the DR.

In an implementation, that the terminal device sends a second response message to the DR includes: The terminal device encrypts a second random number by using the second DR public key, where the second random number is generated by the terminal device. The terminal device sends a second response message to the DR, where the second response message includes a first random number encrypted by using the second DR public key and a second random number encrypted by using the second DR public key.

In an implementation, the method further includes: The terminal device receives a third message sent by the DR, where the third message includes a second random number encrypted by using the second terminal device public key. The terminal device decrypts, by using the private key of the terminal device, the second random number encrypted by using the second terminal device public key, to obtain the second random number.

According to a third aspect, a mutual authentication method is provided. The method includes: A subscription identifier de-concealing function SIDF sends a tenth message to a distributed mapping system DMS, where the tenth message is used to query an identifier of a digital reflection DR corresponding to a terminal device, and the tenth message includes an identifier of the terminal device. The SIDF receives a tenth response message sent by the DMS, where the tenth response message includes the identifier of the DR. The SIDF sends a fifth message to the DR, where the fifth message includes the identifier of the terminal device.

In an implementation, before the subscription identifier de-concealing function SIDF sends the tenth message to the distributed mapping system DMS, the method further includes: The SIDF receives an authentication request message sent by a network device, where the authentication request message includes a first terminal device identifier, an identifier of a serving network in which the network device is located, and an identifier that is of a home network and that is signed by using a private key of the serving network. The SIDF sends a ninth message to a distributed database DDB, where the ninth message is used to obtain a public key of the serving network, and the ninth message includes the identifier of the serving network. The SIDF receives a ninth response message sent by the DDB, where the ninth response message includes the public key of the serving network. The SIDF verifies, by using the public key of the serving network, the identifier that is of the home network and that is signed by using the private key of the serving network, to obtain an identifier of the home network, thereby verifying that the serving network is valid.

In an implementation, the method further includes: The SIDF decrypts the first terminal device identifier by using a private key of the home network, to obtain the identifier of the terminal device.

According to a fourth aspect, a communication apparatus is provided, including a processor and a transceiver. The transceiver is configured to: receive computer code or instructions, and transmit the computer code or the instructions to the processor. The processor runs the computer code or the instructions, to perform the method according to the first aspect or any possible implementation of the first aspect.

According to a fifth aspect, a communication apparatus is provided, including a processor and a transceiver. The transceiver is configured to: receive computer code or instructions, and transmit the computer code or the instructions to the processor. The processor runs the computer code or the instructions, to perform the method according to the second aspect or any possible implementation of the second aspect.

According to a sixth aspect, a communication system is provided, including: the digital reflection DR and the terminal device in the methods according to the first aspect and the second aspect.

According to a seventh aspect, a computer-readable storage medium is provided. The computer-readable medium stores a computer program. When the computer program is run on a computer, the computer is enabled to perform the method according to the first aspect or any possible implementation of the first aspect.

According to an eighth aspect, a computer-readable storage medium is provided. The computer-readable medium stores a computer program. When the computer program is run on a computer, the computer is enabled to perform the method according to the second aspect or any possible implementation of the second aspect.

DESCRIPTION OF EMBODIMENTS

The following describes technical solutions of this application with reference to accompanying drawings.

Embodiments of this application may be applied to various communication systems, for example, wireless local area network (WLAN) systems, narrowband interne of things (NB-IoT) systems, global systems for mobile communication (GSM), enhanced data rates for GSM evolution (EDGE) systems, wideband code division multiple access (WCDMA) systems, code division multiple access 2000 (CDMA2000) systems, time division-synchronous code division multiple access (TD-SCDMA) systems, long term evolution (LTE) systems, satellite communication systems, fifth generation (5G) systems, or new communication systems that will emerge in the future.

The terminal device in embodiments of this application may include various handheld devices, vehicle-mounted devices, wearable devices, or computing devices that have a wireless communication function, or other processing devices connected to a wireless modem. A terminal may be a mobile station (MS), a subscriber unit, a user equipment (UE), a cellular phone, a smartphone, a wireless data card, a personal digital assistant (PDA) computer, a tablet computer, a wireless modem (modem), a handheld device (handset), a laptop computer, a machine type communication (MTC) terminal, or the like.

Existing communication networks are all network-centric, and users adapt to the networks. In other words, the users can select only functions provided by the networks. What's worse, functions provided by a centralized core network are of a large granularity. Consequently, personalized requirements of the users cannot be satisfied. An existing network element entity of the centralized core network can generally handle a large quantity of users. In addition, the network element entity of the centralized core network is centrally deployed, and has a relatively high position in the network. This poses a risk of a single point of failure. For example, the network element entity of the centralized core network may be a mobility management network element, a session management network element, a user data management network element, or a policy management network element.

Figure 1:
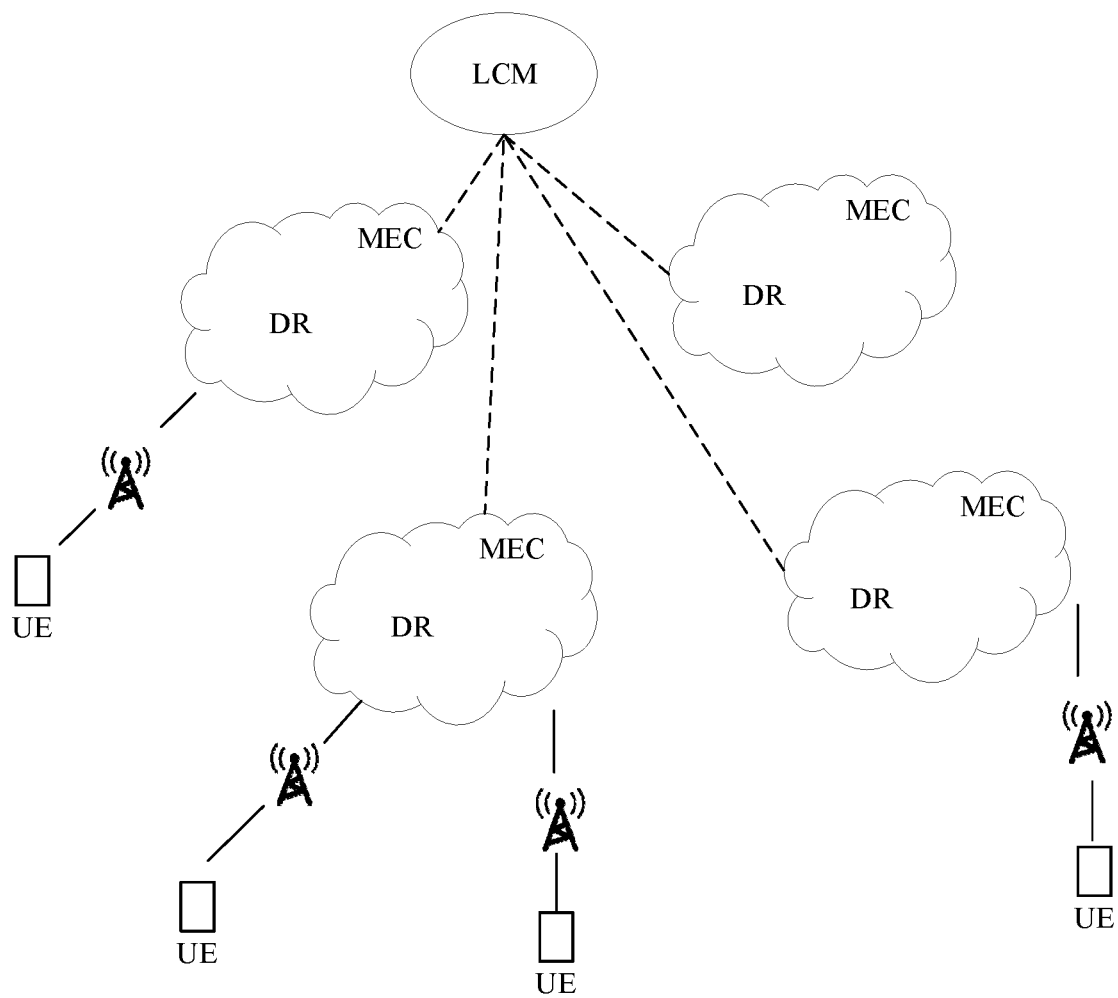
FIG. 1 is a schematic diagram of a UCN architecture.

To resolve the foregoing problem, a user-centric network (UCN) architecture is proposed. As shown in FIG. 1, a digital reflection (DR) is deployed on an edge cloud. Each UE has its own DR. The DR may be dynamically migrated with a user as required to multi-access edge computing (MEC) in which the user is located, to implement a design of the user-centric network architecture.

A distributed data provisioning system (DDPS) can manage personal digital property of users, including identities, application name identifiers, and state information of the users. A distributed mapping system (DMS) is established between user identities, application names, and addresses based on technologies such as distributed hashing. The distributed mapping system is deployed on edge clouds in a distributed manner, and meets near real-time update and query requirements. A life cycle management (LCM) system implements life cycle management and operations on DRs based on a distributed architecture.

The UCN architecture is a revolutionary design compared to an existing network architecture. Therefore, many existing network functions, communication solutions, working procedures, and the like need to be changed accordingly. Two-way authentication between a user and a network is a relatively important key procedure in an initial phase of establishing a communication connection. Embodiments of this application mainly focus on a user and DR— based authentication mechanism and procedure in the UCN architecture.

To facilitate understanding of embodiments of this application, two-way authentication between a user and a network in an existing technical solution is briefly described.

In LTE, two-way authentication between a UE and a network is performed by the UE, a mobility management entity (MME), and a home subscriber server (HSS) together. The UE sends an attach request that includes a globally unique temporary identity (GUTI)/an international mobile subscriber identity (IMSI). The MME adds an ID of the to-be-visited network to the attach request and forwards the attach request to the HSS. If verification of the IMSI and the ID succeeds, an authentication vector group is generated and sent to the MIME. The MME selects a vector, allocates a key, and sends an authentication request to the UE. The UE extracts information from the authentication request. If verification succeeds, authenticity of the HSS is verified. Then, a response (RES) to the authentication request is calculated and sent to the MME. The MME performs comparison on the RES. If the RES is consistent, the UE is authenticated. In this way, two-way authentication is completed, and an encryption key and a protection key are calculated based on an agreed algorithm, to implement subsequent confidential communication.

In this solution, during initial attachment of the user, the IMSI is transmitted in plaintext over an air interface. This may pose risks of IMSI sniffing and tracing attacks. Besides, a centralized authentication network element has risks of a distributed denial-of-service (DDoS) attack and a single point of failure. In addition, a serving network is involved in authentication in a roaming scenario, and when there is a fraud in the serving network, a risk is brought to the user.

In 5G, two-way authentication between a UE and a network is performed by the UE together with an authentication server function (AUSF) in a home network and an access and mobility management function (AMF). An authentication procedure in 5G is similar to the authentication procedure in LTE. Differences are as follows: In an initial registration phase, a user identity is encrypted and transmitted over an air interface, to avoid interception of the user identity. In 5G authentication, mutual authentication between a user terminal and a home network of the user terminal implements a unified authentication mechanism for a user in different scenarios, such as a visited place and home. 5G unifies 3GPP and non-3GPP authentication methods, and supports two methods: extensible authentication protocol—authentication and key agreement' (EAP-AKA') and 5G authentication and key agreement (5G AKA).

However, a centralized authentication network element of a core network has risks of a DDoS attack and a single point of failure. When a UE checks authenticity and freshness of an identifier of an authentication signal, it is not explicitly required to use a function to protect a counter (SQN) that is used as an input. An attacker may learn an SQN of a user by tracing a nearby SQN for a period of time, to implement a location attack or an activity monitoring attack.

Figure 2:
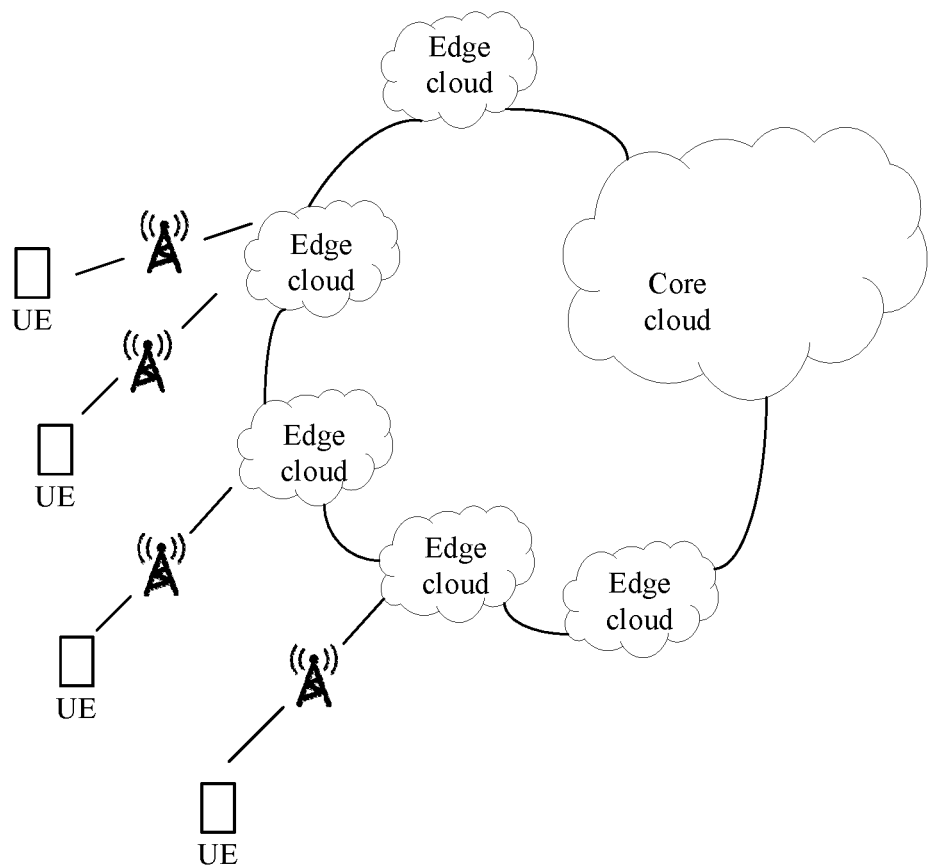
FIG. 2 is a schematic diagram of a network architecture in which edge clouds are widely deployed according to an embodiment of this application.

Network edge cloudification will become an inevitable trend in the future. An edge cloud and a core cloud collaborate with and complement each other. The edge cloud is closer to the user, thereby better supporting applications with high requirements for a latency, data privacy, and the like. The edge cloud is suitable for distributed deployment of network functions. Embodiments of this application are based on an application scenario in which edge clouds are assumed to be widely deployed. FIG. 2 is a schematic diagram of a network architecture in which edge clouds are widely deployed according to an embodiment of this application.

Figure 3:
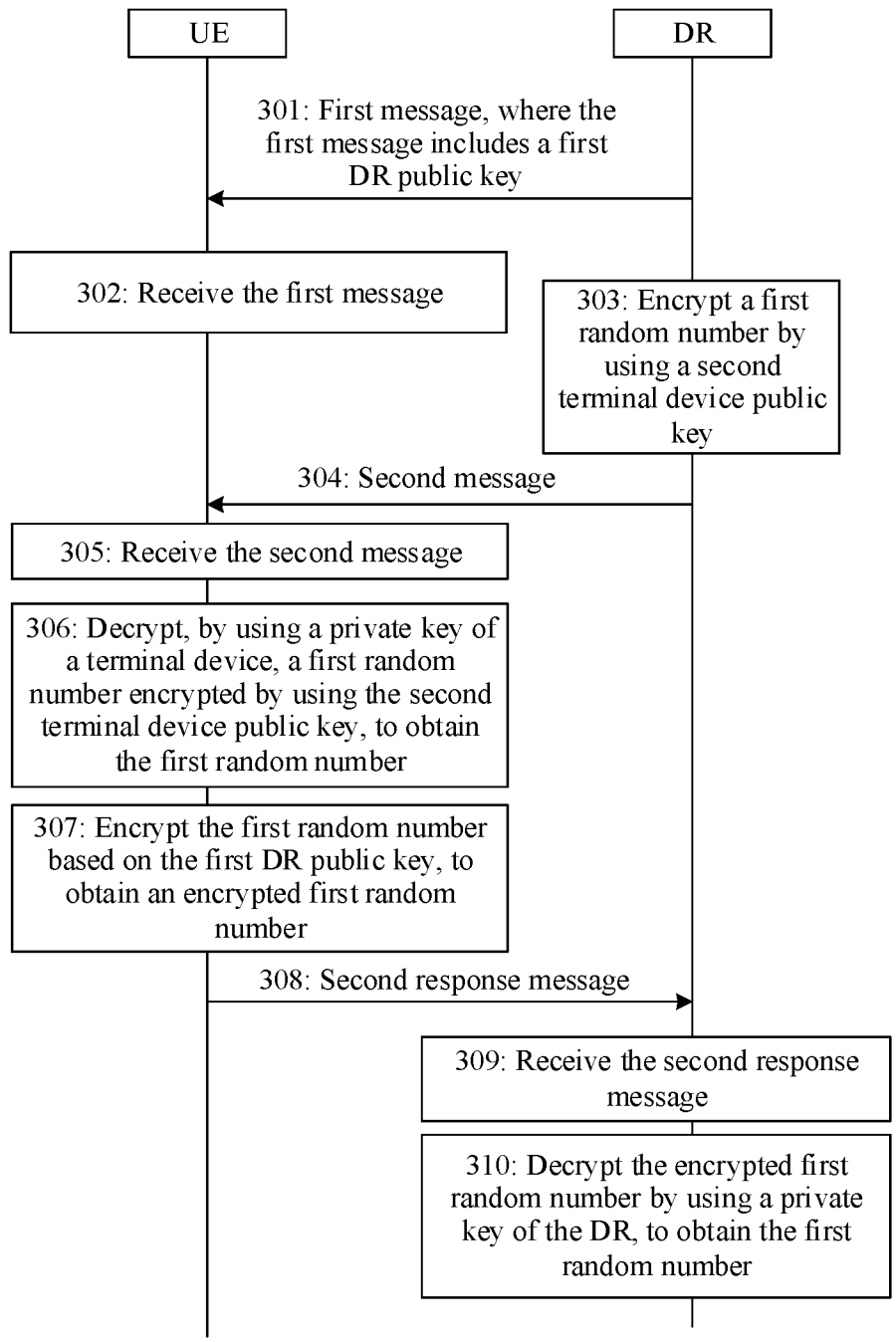
FIG. 3 is an interaction flowchart of a mutual authentication method according to an embodiment of this application.

An embodiment of this application provides a mutual authentication method, applied to a scenario in which two-way authentication needs to be performed between a user and a network in a UCN architecture, for example, a scenario in which two-way authentication is required when the user turns on a UE for a first time and performs registration, or a scenario in which two-way authentication needs to be performed again when the user turns off a UE for a long time and then turns on the UE. FIG. 3 is a schematic interaction flowchart of a mutual authentication method according to an embodiment of this application.

301: A digital reflection DR sends a first message to a terminal device, where the first message includes a first DR public key, and the first DR public key is a public key that is of the DR and that is signed by using a private key of a home network.

Optionally, before the digital reflection DR sends the first message to the terminal device, the DR may request a public key of the DR and a public key of the terminal device from a distributed database (DDB).

Specifically, the DR may send a fourth message to the DDB, to request the public key of the terminal device and the public key of the DR. The fourth message includes an identifier of the terminal device and an identifier of the DR. The DDB receives the fourth message sent by the DR, and sends a fourth response message to the DR based on the identifier of the terminal device and the identifier of the DR that are in the fourth message. The fourth response message includes a first terminal device public key and the first DR public key. The first terminal device public key is a public key that is of the terminal device and that is signed by using the private key of the home network. The DR receives the fourth response message sent by the DDB, and obtains the first terminal device public key and the first DR public key from the fourth response message. It should be understood that, the public keys requested by the DR from the DDB are all signed by an operator by using the private key of the home network.

302: The terminal device receives the first message sent by the digital reflection DR, and verifies, by using a public key of the home network, the first DR public key included in the first message, to obtain a second DR public key, where the second DR public key is a public key that is of the DR and that is verified by using the public key of the home network. It should be understood that, the first DR public key and the second DR public key are public keys that present different states and that are obtained by signing or verifying the public key of the DR. The public key of the home network is known to the terminal device.

303: The DR may verify the first terminal device public key by using the public key of the home network, to obtain a second terminal device public key; and the DR encrypts a first random number by using the second terminal device public key, where the first random number is generated by the DR, and the second terminal device public key is a public key that is of the terminal device and that is verified by using the public key of the home network. It should be understood that, the first terminal device public key and the second terminal device public key are public keys that present different states and that are obtained by signing or verifying the public key of the terminal device. The public key of the home network is also known to the DR.

304: The DR sends a second message to the terminal device, where the second message includes a first random number encrypted by using the second terminal device public key.

305: The terminal device receives the second message sent by the DR.

306: The terminal device decrypts, by using a private key of the terminal device, the first random number encrypted by using the second terminal device public key, to obtain the first random number. The private key of the terminal device is unique to the terminal device. Only the terminal device can decrypt the first random number encrypted by using the second terminal device public key.

307: The terminal device encrypts the first random number based on the first DR public key, to obtain an encrypted first random number. Specifically, the terminal device encrypts the first random number by using the second DR public key, to obtain a first random number encrypted by using the second DR public key.

Optionally, the terminal device encrypts a second random number by using the second DR public key, to generate a second random number encrypted by using the second DR public key, where the second random number is generated by the terminal device.

308: The terminal device sends a second response message to the DR, where the second response message includes the first random number encrypted by using the second DR public key.

Optionally, the second response message further includes the second random number encrypted by using the second DR public key.

309: The DR receives the second response message sent by the terminal device, where the second response message includes the first random number encrypted by using the second DR public key, or the second response message includes the first random number encrypted by using the second DR public key and the second random number encrypted by using the second DR public key.

310: The DR decrypts, by using a private key of the DR, the first random number encrypted by using the second DR public key, to obtain the first random number. In this case, the DR determines that the terminal device is a target terminal device of the DR. The target terminal device may be understood as a terminal device associated with the DR. The private key of the DR is unique to the DR. Only the DR can decrypt the first random number encrypted by using the second DR public key.

Optionally, if the second response message further includes the second random number encrypted by using the second DR public key, the DR decrypts, by using the private key of the DR, the second random number encrypted by using the second DR public key, to obtain the second random number. The DR encrypts the second random number by using the second terminal device public key, and sends a third message to the terminal device, where the third message includes a second random number encrypted by using the second terminal device public key.

Optionally, the terminal device receives the third message sent by the DR, and decrypts, by using the private key of the terminal device, the second random number encrypted by using the second terminal device public key, to obtain the second random number. In this case, the terminal device determines that the DR is a target DR of the terminal device. The target DR may be understood as a DR associated with the terminal device.

In the technical solution provided in this embodiment of this application, the DR encrypts the first random number by using the public key of the terminal device, and sends an encrypted first random number to the terminal device. If the terminal device obtains the first random number through decryption by using the private key of the terminal device, the terminal device is authenticated by the DR, and the terminal device is a terminal device associated with the DR. This solution can implement authentication between a terminal device and a network in the UCN architecture, thereby avoiding a risk of user information leakage.

Optionally, before the DR sends the fourth message to the DDB, authentication between the terminal device and the DR further includes an initial protocol phase. The phase is used to determine that authentication is performed between the terminal device and the DR.

Figure 4:
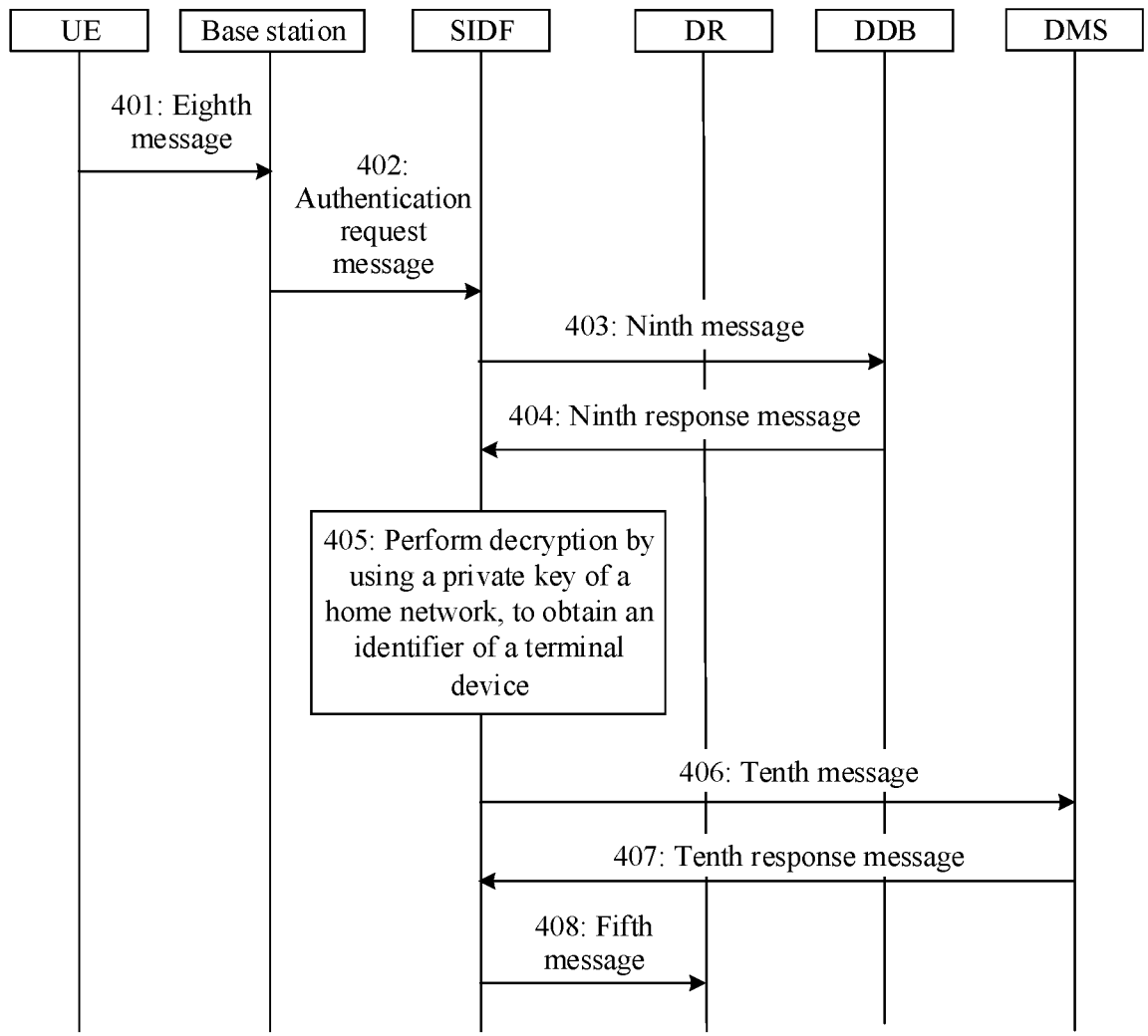
FIG. 4 is a schematic interaction flowchart of an initial phase of mutual authentication between a terminal device and a DR according to an embodiment of this application.

FIG. 4 is a schematic interaction flowchart of an initial phase of mutual authentication between a terminal device and a DR.

401: The terminal device sends an eighth message to a network device, for example, a base station, in a serving network (SN), where the eighth message includes a first terminal device identifier and an identifier (home network identity, HNid) of a home network that is sent in plaintext, and the first terminal device identifier is an identifier that is of the terminal device and that is encrypted by using a public key of the home network. The identifier of the home network is used to address the home network. It should be understood that sending in plaintext is a sending manner without encryption by using a public key or signing by using a private key.

402: The base station receives the eighth message sent by the terminal device, and sends an authentication request message to a subscription identifier de-concealing function (SIDF) of the home network based on the identifier of the home network in the eighth message, where the authentication request message includes the first terminal device identifier, an identifier (serving network identity, SNid) of the serving network in which the base station is located, and an HNid that is signed by using a private key of the SN.

It should be understood that the SIDF is a function module deployed on an edge cloud, and is configured to decrypt a first terminal identifier and find a DR corresponding to the terminal device.

403: The SIDF receives the authentication request message sent by the base station. First, validity of the SN needs to be verified, to prevent a terminal device that accesses a fake base station from interacting with the fake base station. The SIDF sends a ninth message to a DDB, where the ninth message is used to request a public key of the SN from the DDB, and the ninth message may include the SNid.

404: The DDB receives the ninth message sent by the SIDF, and sends a ninth response message to the SIDF based on the ninth message, where the ninth response message includes the public key of the SN. The SIDF receives the ninth response message sent by the DDB, obtains the public key of the SN from the ninth response message, and verifies, by using the public key of the SN, the HNid that is signed by using the private key of the SN. If the HNid can be obtained through correct verification, the SN is perceived to be valid or the base station is perceived to be valid. It should be understood that only the public key of the SN can be used to verify the private key of the SN, and a public key of a valid SN is registered with the DDB by an operator.

405: The authentication request message sent by the base station and received by the SIDF includes the first terminal device identifier, and the SIDF decrypts the first terminal device identifier by using a private key of the home network, to obtain an identifier of the terminal device. In this way, the SIDF learns a terminal device on which network authentication needs to be performed.

406: The SIDF further needs to learn a DR, where authentication is performed between the DR and the terminal device. A DMS includes information about mapping between the terminal device and the DR. Therefore, the SIDF sends a tenth message to the DMS, and queries the DMS for the DR corresponding to the terminal device, where the tenth message includes the identifier of the terminal device.

407: The DMS receives the tenth message sent by the SIDF; queries, based on the identifier of the terminal device in the tenth message, the DR corresponding to the terminal device; and sends a tenth response message to the SIDF, where the tenth response message includes an identifier of the DR corresponding to the terminal device.

408: The SIDF receives the tenth response message sent by the DMS; obtains the identifier of the DR corresponding to the terminal device from the tenth response message; and sends a fifth message to the DR based on the identifier of the DR, where the fifth message includes the identifier of the terminal device, so that subsequent authentication is performed between the DR and the terminal device.

Figure 5:
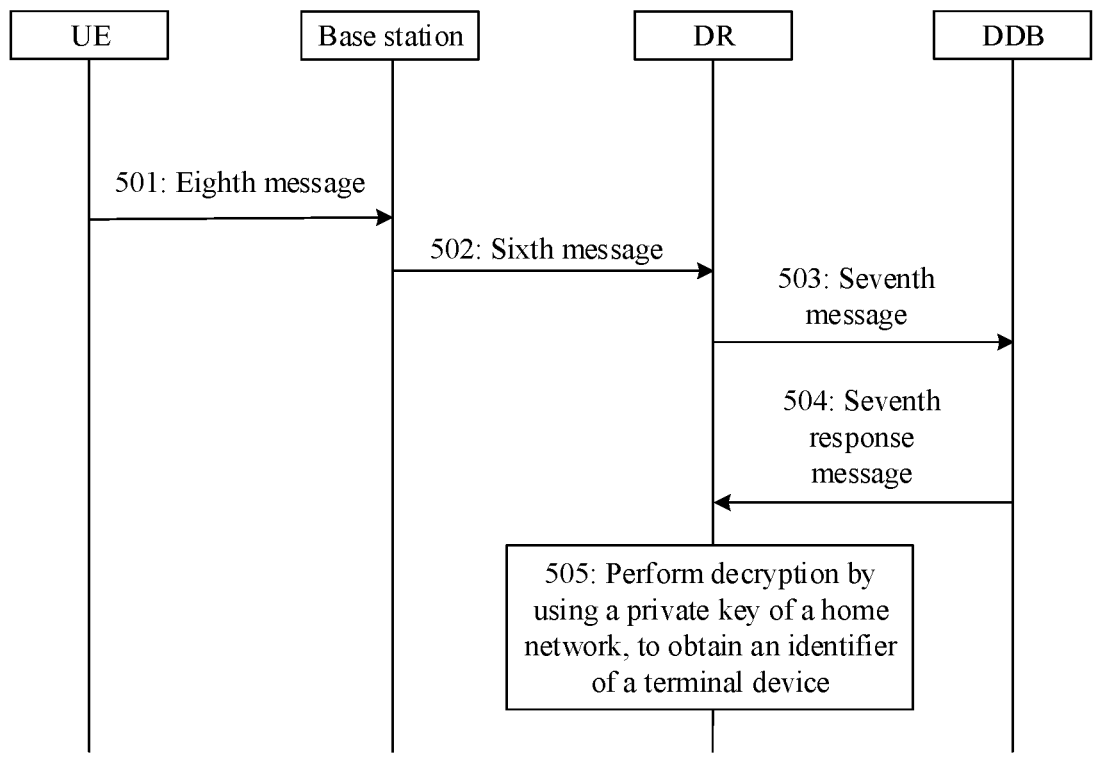
FIG. 5 is another schematic interaction flowchart of an initial phase of mutual authentication between a terminal device and a DR according to an embodiment of this application.

Optionally, FIG. 5 is another schematic interaction flowchart of an initial phase of mutual authentication between a terminal device and a DR.

501: The terminal device sends an eighth message to a network device, for example, a base station, in a serving network (SN), where the eighth message includes a first terminal device identifier, an identifier (home network identity, HNid) of a home network that is sent in plaintext, and an identifier of the DR; and the first terminal device identifier is an identifier that is of the terminal device and that is encrypted by using a public key of the home network. The identifier of the home network is used to address the home network.

It should be understood that after the terminal device (a user) subscribes to an operator, the operator allocates a DR and an initial identifier of the DR to the terminal device in the home network, and writes the identifier of the DR and the identifier of the home network into a universal subscriber identity module (USIM) card of the terminal device. The operator further maps an identifier of the terminal device and the identifier of the DR in a DMS.

502: The base station receives the eighth message sent by the terminal device, and sends a sixth message to the DR based on the identifier of the DR in the eighth message, where the sixth message includes the first terminal device identifier. The DR receives the sixth message sent by the base station.

Optionally, the sixth message further includes an identifier that is of the home network and that is signed by using a private key of the SN. The DR obtains a public key of the SN, and decrypts the identifier that is of the home network and that is signed by using the private key of the SN, to verify validity of the base station (the serving network) accessed by the terminal device.

503: The DR sends a seventh message to a DDB, where the seventh message is used to request the public key of the SN, and the seventh message may include an SNid.

504: The DDB receives the seventh message sent by the DR, and sends a seventh response message to the DR based on the SNid in the seventh message, where the seventh response message includes a public key that is of the SN and that is signed by using a private key of the home network.

The DR receives the seventh response message sent by the DDB, and verifies, by using the public key of the home network, the public key that is of the SN and that is signed by using the private key of the home network, to obtain the public key of the SN.

The DR verifies, by using the public key of the SN, the identifier that is of the home network and that is signed by using the private key of the SN. If the identifier HNid of the home network can be obtained through correct verification, the SN is perceived to be valid or the base station is perceived to be valid. It should be understood that only the public key of the SN can be used to verify the private key of the SN, and a public key of a valid SN is registered with the DDB by the operator.

505: The sixth message sent by the base station and received by the DR includes the first terminal device identifier, and the DR decrypts the first terminal device identifier by using the private key of the home network, to obtain the identifier of the terminal device. In this way, the DR learns a terminal device, where authentication needs to be performed between the DR and the terminal device.

Figure 6:
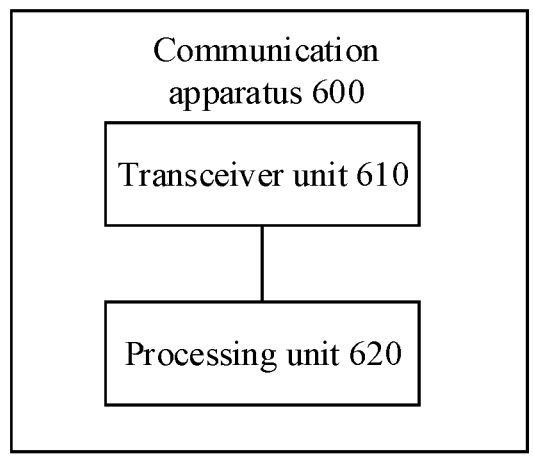
FIG. 6 is a schematic block diagram of a communication apparatus according to an embodiment of this application.

FIG. 6 is a schematic block diagram of a communication apparatus 600 according to an embodiment of this application. The communication apparatus may be applied to the DR in the method embodiments shown in FIG. 3 to FIG. 5, or may be a component, for example, a chip, that implements the methods in the embodiments shown in FIG. 3 to FIG. 5. The communication apparatus 600 includes a transceiver unit 610 and a processing unit 620.

The transceiver unit 610 is configured to send a first message to a terminal device. The first message includes a first DR public key, and the first DR public key is a public key that is of a DR and that is signed by using a private key of a home network.

The processing unit 620 is configured to encrypt a first random number by using a second terminal device public key. The first random number is generated by the DR, and the second terminal device public key is a public key that is of the terminal device and that is verified by using a public key of the home network.

The transceiver unit 610 is further configured to send a second message to the terminal device. The second message includes a first random number encrypted by using the second terminal device public key.

The transceiver unit 610 is further configured to receive a second response message sent by the terminal device. The second response message includes a first random number encrypted by using a second DR public key, and the second DR public key is a public key that is of the DR and that is obtained by verifying the first DR public key by using the public key of the home network.

The processing unit 620 is further configured to decrypt, by using a private key of the DR, the encrypted first random number, to obtain the first random number.

Optionally, the second response message further includes a second random number encrypted by using the second DR public key. The second random number is generated by the terminal device.

Optionally, the processing unit 620 is further configured to: decrypt, by using the private key of the DR, the second random number encrypted by using the second DR public key, to obtain the second random number; and encrypt the second random number by using the second terminal device public key.

The transceiver unit 610 is further configured to send a third message to the terminal device. The third message includes a second random number encrypted by using the second terminal device public key.

Optionally, before sending the first message to the terminal device, the transceiver unit 610 is further configured to: send a fourth message to a distributed database DDB, where the fourth message is used to request a public key of the terminal device and a public key of the DR, and the fourth message includes an identifier of the terminal device and an identifier of the DR; and receive a fourth response message sent by the DDB, where the fourth response message includes a first terminal device public key and the first DR public key, and the first terminal device public key is a public key that is of the terminal device and that is signed by using the private key of the home network.

Optionally, the processing unit 620 is specifically configured to verify the first terminal device public key by using the public key of the home network, to obtain the second terminal device public key.

Optionally, before sending the fourth message to the distributed database DDB, the transceiver unit 610 is further configured to receive a fifth message sent by a subscription identifier de-concealing function SIDF. The fifth message includes the identifier of the terminal device.

Optionally, before sending the fourth message to the distributed database DDB, the transceiver unit 610 is further configured to receive a sixth message sent by a network device. The sixth message includes a first terminal device identifier, and the first terminal device identifier is an identifier that is of the terminal device and that is encrypted by using the public key of the home network.

Optionally, the processing unit 620 is further configured to decrypt the first terminal device identifier by using the private key of the home network, to obtain the identifier of the terminal device.

Optionally, the sixth message further includes an identifier that is of the home network and that is signed by using a private key of the network device.

The processing unit 620 is further configured to decrypt, by using a public key of the network device, the identifier that is of the home network and that is signed by using the private key of the network device, to verify that the network device is valid.

Optionally, before decrypting, by using the public key of the network device, the identifier that is of the home network and that is signed by using the private key of the network device, the transceiver unit 610 is further configured to: send a seventh message to the DDB, where the seventh message is used to request the public key of the network device, and the seventh message includes an identifier of the network device; and receive a seventh response message sent by the DDB, where the seventh response message includes a public key that is of the network device and that is signed by using the private key of the home network.

The processing unit 620 is further configured to verify, by using the public key of the home network, the public key that is of the network device and that is signed by using the private key of the home network, to obtain the public key of the network device.

Figure 7:
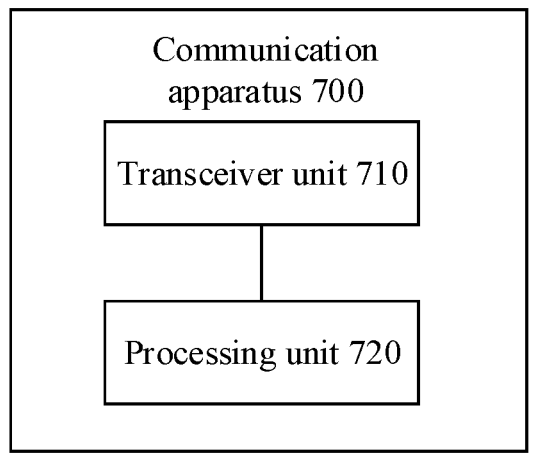
FIG. 7 is a schematic block diagram of another communication apparatus according to an embodiment of this application.

FIG. 7 is a schematic block diagram of a communication apparatus 700 according to an embodiment of this application. The communication apparatus may be applied to the terminal device in the method embodiments shown in FIG. 3 to FIG. 5, or may be a component, for example, a chip, that implements the methods in the embodiments shown in FIG. 3 to FIG. 5. The communication apparatus 700 includes a transceiver unit 710 and a processing unit 720.

The transceiver unit 710 is configured to receive a first message sent by a digital reflection DR. The first message includes a first DR public key, and the first DR public key is a public key that is of the DR and that is signed by using a private key of a home network.

The transceiver unit 710 is further configured to receive a second message sent by the DR. The second message includes a first random number encrypted by using a second terminal device public key. The first random number is generated by the DR. The second terminal device public key is a public key that is of a terminal device and that is verified by using a public key of the home network.

The processing unit 720 is configured to decrypt, by using a private key of the terminal device, the first random number encrypted by using the second terminal device public key, to obtain the first random number.

The processing unit 720 is further configured to encrypt the first random number based on the first DR public key, to obtain an encrypted first random number.

The transceiver unit 710 is further configured to send a second response message to the DR. The second response message includes the encrypted first random number.

Optionally, the processing unit 720 is specifically configured to: verify the first DR public key by using the public key of the home network, to obtain a second DR public key, where the second DR public key is a public key that is of the DR and that is verified by using the public key of the home network; and encrypt the first random number by using the second DR public key.

Optionally, before receiving the first message sent by the digital reflection DR, the transceiver unit 710 is further configured to send an eighth message to a network device. The eighth message includes a first terminal device identifier, and the first terminal device identifier is an identifier that is of the terminal device and that is encrypted by using the public key of the home network.

Optionally, the eighth message further includes an identifier of the DR.

Optionally, the processing unit 720 is further configured to encrypt a second random number by using the second DR public key. The second random number is generated by the terminal device.

The transceiver unit 710 is specifically configured to send a second response message to the DR. The second response message includes a first random number encrypted by using the second DR public key and a second random number encrypted by using the second DR public key.

Optionally, the transceiver unit 710 is further configured to receive a third message sent by the DR. The third message includes a second random number encrypted by using the second terminal device public key.

The processing unit 720 is further configured to decrypt, by using the private key of the terminal device, the second random number encrypted by using the second terminal device public key, to obtain the second random number.

Figure 8:
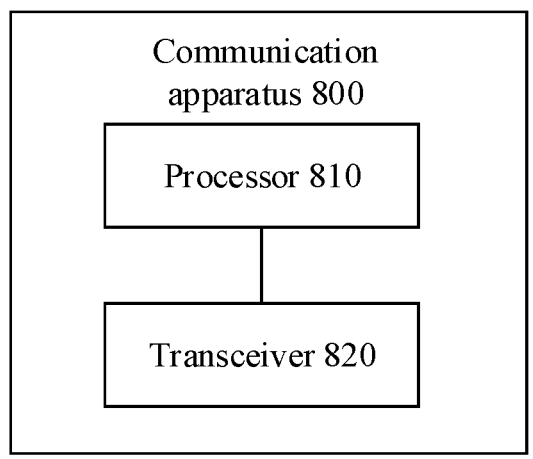
FIG. 8 is a schematic block diagram of still another communication apparatus according to an embodiment of this application.

FIG. 8 is a schematic block diagram of a communication apparatus 800 according to an embodiment of this application. The communication apparatus includes a processor 810 and a transceiver 820. The transceiver 820 is configured to receive computer code or instructions, and transmit the computer code or the instructions to the processor 810. The processor 810 runs the computer code or the instructions, to implement the methods according to embodiments of this application.

An embodiment of this application provides a communication device, including a memory and a processor. The memory is configured to store a computer program. The processor is configured to execute the computer program stored in the memory, so that the communication device performs the methods according to embodiments of this application. Optionally, the communication device may be the terminal device or the digital reflection DR in embodiments of this application.

The foregoing processor may be an integrated circuit chip with a signal processing capability. In an implementation process, steps in the foregoing method embodiments may be implemented by using a hardware integrated logic circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general purpose processor may be a microprocessor, or the processor may be any conventional processor or the like. The steps in the methods disclosed with reference to embodiments of this application may be directly performed and completed by a hardware decoding processor, or may be performed and completed by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The foregoing memory may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. By way of example and not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be understood that the memory may be integrated into the processor, the processor and the memory may be integrated into a same chip, or the processor and the memory may be separately located on different chips and connected in an interface coupling manner. This is not limited in this embodiment of this application. An embodiment of this application provides a communication chip, including a processor and a communication interface. The processor is configured to read an instruction, to perform the methods in embodiments of this application.

An embodiment of this application further provides a computer-readable storage medium. The computer-readable storage medium stores a computer program used to implement the methods in the foregoing method embodiments. When the computer program is run on a computer, the computer is enabled to implement the methods in the foregoing method embodiments.

A person of ordinary skill in the art may be aware that the units and algorithm steps in the examples described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each specific application, but it should not be considered that the implementation goes beyond the scope of this application.

The person skilled in the art may clearly understand that, for the purpose of convenient and brief description, for specific working processes of the foregoing system, apparatuses, and units, refer to corresponding processes in the foregoing method embodiments. Details are not described herein again.

In several embodiments provided in this application, it should be understood that the disclosed system, apparatuses, and methods may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate, and the parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A mutual authentication method, comprising:
sending, by a digital reflection (DR) on an edge cloud, a first message to a terminal device, wherein the first message comprises a first DR public key, and the first DR public key is a public key that is of the DR and that is signed by using a private key of a home network;
encrypting, by the DR, a first random number by using a second terminal device public key, wherein the first random number is generated by the DR, and the second terminal device public key is a public key that is of the terminal device and that is verified by using a public key of the home network;
sending, by the DR, a second message to the terminal device, wherein the second message comprises the first random number encrypted by using the second terminal device public key;
receiving, by the DR, a second response message sent by the terminal device, wherein the second response message comprises an encrypted first random number encrypted by using a second DR public key and a second random number encrypted by using the second DR public key, the second random number is generated by the terminal device, and the second DR public key is a public key that is of the DR and that is obtained by verifying the first DR public key by using the public key of the home network;
decrypting, by the DR, the encrypted first random number by using a private key of the DR to obtain the first random number;
decrypting, by the DR by using the private key of the DR, the second random number encrypted by using the second DR public key to obtain the second random number;
encrypting, by the DR, the second random number by using the second terminal device public key; and
sending, by the DR, a third message to the terminal device, wherein the third message comprises the second random number encrypted by using the second terminal device public key.

2. The method according to claim 1, wherein before sending, by the DR, the first message to the terminal device, the method further comprises:
sending, by the DR, a fourth message to a distributed database (DDB), wherein the fourth message is used to request a public key of the terminal device and a public key of the DR, and the fourth message comprises an identifier of the terminal device and an identifier of the DR; and
receiving, by the DR, a fourth response message sent by the DDB, wherein the fourth response message comprises a first terminal device public key and the first DR public key, and the first terminal device public key is a public key that is of the terminal device and that is signed by using the private key of the home network.

3. The method according to claim 2, wherein receiving, by the DR, the fourth response message sent by the DDB comprises:
verifying, by the DR, the first terminal device public key by using the public key of the home network, to obtain the second terminal device public key.

4. The method according to claim 2, wherein before sending, by the DR, the fourth message to the DDB, the method further comprises:
receiving, by the DR, a fifth message sent by a subscription identifier de-concealing function (SIDF), wherein the fifth message comprises the identifier of the terminal device.

5. The method according to claim 2, wherein before sending, by the DR, the fourth message to the DDB, the method further comprises:
receiving, by the DR, a sixth message sent by a network device, wherein the sixth message comprises a first terminal device identifier, and the first terminal device identifier is an identifier that is of the terminal device and that is encrypted by using the public key of the home network.

6. The method according to claim 5, wherein receiving, by the DR, the sixth message sent by the network device comprises:
decrypting, by the DR, the first terminal device identifier by using the private key of the home network to obtain the identifier of the terminal device.

7. The method according to claim 5, wherein the sixth message further comprises an identifier that is of the home network and that is signed by using a private key of the network device, and the method further comprises:
decrypting, by the DR by using a public key of the network device, the identifier that is of the home network and that is signed by using the private key of the network device, to verify that the network device is valid.

8. The method according to claim 7, wherein before the decrypting, by the DR by using a public key of the network device, the identifier that is of the home network and that is signed by using the private key of the network device, the method further comprises:
sending, by the DR, a seventh message to the DDB, wherein the seventh message is used to request the public key of the network device, and the seventh message comprises an identifier of the network device;
receiving, by the DR, a seventh response message sent by the DDB, wherein the seventh response message comprises a public key that is of the network device and that is signed by using the private key of the home network; and
verifying, by the DR by using the public key of the home network, the public key that is of the network device and that is signed by using the private key of the home network, to obtain the public key of the network device.

9. A mutual authentication method, comprising:
receiving, by a terminal device, a first message sent by a digital reflection (DR) on an edge cloud, wherein the first message comprises a first DR public key, and the first DR public key is a public key that is of the DR and that is signed by using a private key of a home network;
receiving, by the terminal device, a second message sent by the DR, wherein the second message comprises a first random number encrypted by using a second terminal device public key, the first random number is generated by the DR, and the second terminal device public key is a public key that is of the terminal device and that is verified by using a public key of the home network;

decrypting, by the terminal device by using a private key of the terminal device, the first random number encrypted by using the second terminal device public key to obtain the first random number;

encrypting, by the terminal device, the first random number based on the first DR public key to obtain an encrypted first random number, wherein encrypting the first random number comprises:

verifying, by the terminal device, the first DR public key by using the public key of the home network to obtain a second DR public key, wherein the second DR public key is a public key that is of the DR and that is verified by using the public key of the home network; and encrypting, by the terminal device, the first random number by using the second DR public key; and sending, by the terminal device, a second response message to the DR, wherein the second response message comprises the encrypted first random number.

10. The method according to claim 9, wherein before receiving, by the terminal device, the first message sent by the DR, the method further comprises:

sending, by the terminal device, an eighth message to a network device, wherein the eighth message comprises a first terminal device identifier, and the first terminal device identifier is an identifier that is of the terminal device and that is encrypted by using the public key of the home network.

11. The method according to claim 10, wherein the eighth message further comprises an identifier of the DR.

12. The method according to claim 9, wherein sending, by the terminal device, the second response message to the DR comprises:

encrypting, by the terminal device, a second random number by using the second DR public key, wherein the second random number is generated by the terminal device; and sending, by the terminal device, the second response message to the DR, wherein the second response message comprises the first random number encrypted by using the second DR public key and the second random number encrypted by using the second DR public key.

13. The method according to claim 12, wherein the method further comprises:

receiving, by the terminal device, a third message sent by the DR, wherein the third message comprises the second random number encrypted by using the second terminal device public key; and decrypting, by the terminal device by using the private key of the terminal device, the second random number encrypted by using the second terminal device public key to obtain the second random number.

14. A communication apparatus, comprising:
at least one processor; and
one or more memories coupled to the at least one processor and storing programming instructions for execution by the at least one processor to perform operations comprising:

sending a first message to a terminal device, wherein the communication apparatus includes a digital reflection (DR) on an edge cloud, the first message comprises a first communication apparatus public key, and the first communication apparatus public key is a public key that is of the communication apparatus and that is signed by using a private key of a home network;

encrypting a first random number by using a second terminal device public key, wherein the first random number is generated by the communication apparatus, and the second terminal device public key is a public key that is of the terminal device and that is verified by using a public key of the home network;

sending a second message to the terminal device, wherein the second message comprises the first random number encrypted by using the second terminal device public key;

receiving a second response message sent by the terminal device, wherein the second response message comprises an encrypted first random number encrypted by using a second communication apparatus public key and a second random number encrypted by using the second communication apparatus public key, the second random number is generated by the terminal device, and the second communication apparatus public key is a public key that is of the communication apparatus and that is obtained by verifying the first communication apparatus public key by using the public key of the home network;

decrypting the encrypted first random number by using a private key of the communication apparatus to obtain the first random number;

decrypting, by using the private key of the communication apparatus, the second random number encrypted by using the second communication apparatus public key to obtain the second random number;

encrypting the second random number by using the second terminal device public key; and sending a third message to the terminal device, wherein the third message comprises the second random number encrypted by using the second terminal device public key.

15. The communication apparatus according to claim 14, wherein before sending the first message to the terminal device, the operations further comprise:

sending a fourth message to a distributed database (DDB), wherein the fourth message is used to request a public key of the terminal device and a public key of the communication apparatus, and the fourth message comprises an identifier of the terminal device and an identifier of the communication apparatus; and receiving a fourth response message sent by the DDB, wherein the fourth response message comprises a first terminal device public key and the first communication apparatus public key, and the first terminal device public key is a public key that is of the terminal device and that is signed by using the private key of the home network.

16. The communication apparatus according to claim 15, wherein receiving the fourth response message sent by the DDB comprises:

verifying the first terminal device public key by using the public key of the home network, to obtain the second terminal device public key.

17. The communication apparatus according to claim 15, wherein before sending the fourth message to the DDB, the operations further comprise:

receiving a fifth message sent by a subscription identifier de-concealing function (SIDF), wherein the fifth message comprises the identifier of the terminal device.

18. The communication apparatus according to claim 15, wherein before sending the fourth message to the DDB, the operations further comprise:
  receiving a sixth message sent by a network device, wherein the sixth message comprises a first terminal device identifier, and the first terminal device identifier is an identifier that is of the terminal device and that is encrypted by using the public key of the home network.

19. The communication apparatus according to claim 18, wherein receiving the sixth message sent by the network device comprises:
  decrypting the first terminal device identifier by using the private key of the home network to obtain the identifier of the terminal device.

20. The communication apparatus according to claim 18, wherein the sixth message further comprises an identifier that is of the home network and that is signed by using a private key of the network device, and the operations further comprise:
  decrypting, by using a public key of the network device, the identifier that is of the home network and that is signed by using the private key of the network device, to verify that the network device is valid.

* * * * *